United States Patent [19]
Iijima et al.

[11] Patent Number: 6,141,956
[45] Date of Patent: Nov. 7, 2000

[54] COMBINED POWER GENERATION PLANT

[75] Inventors: Masaki Iijima; Tetsuya Imai, both of Tokyo, Japan

[73] Assignee: Mitsubishi Heavy Industries, Inc., Tokyo, Japan

[21] Appl. No.: 09/108,897

[22] Filed: Jul. 1, 1998

[30] Foreign Application Priority Data

Aug. 29, 1997 [JP] Japan ................................ 9-233785
Sep. 19, 1997 [JP] Japan ................................ 9-254970

[51] Int. Cl.$^7$ .................................................. F02G 7/08
[52] U.S. Cl. ..................... 60/39.182; 60/39.5; 122/7 R
[58] Field of Search ........................ 60/39.181, 39.182, 60/39.5; 122/7 R, 7 B

[56] References Cited

U.S. PATENT DOCUMENTS

| | | | |
|---|---|---|---|
| 3,930,367 | 1/1976 | Gasparoli | 60/39.182 |
| 4,572,110 | 2/1986 | Haeflich | 60/39.182 |
| 4,693,213 | 9/1987 | Yanai et al. | 122/7 R |
| 5,247,907 | 9/1993 | Lee et al. | 122/7 R |
| 5,628,179 | 5/1997 | Tomlinson | 60/39.182 |
| 5,851,498 | 12/1998 | Rozenshtein et al. | 422/211 |

FOREIGN PATENT DOCUMENTS

94/27034  11/1994  WIPO ................................ 60/39.182

*Primary Examiner*—Charles G. Freay
*Attorney, Agent, or Firm*—Myers Bigel Sibley & Sajovec

[57] ABSTRACT

In a combined power generation plant, an exhaust gas boiler (2) consists of a high-pressure reheat type steam system, in which fuel is supplied to this exhaust gas boiler 2, and the supplied fuel undergoes catalytic reaction in combustion catalysis sections (NOx removal sections) 18 and 19 to increase the temperature of exhaust gas, whereby the power generation efficiency is improved.

16 Claims, 7 Drawing Sheets

COMBINED POWER GENERATION PLANT

BACKGROUND OF THE INVENTION

1. Field of the Invention

The present invention relates to a combined power generation plant.

2. Description of Related Art

Conventionally, a combined power generation plant in which a gas turbine, exhaust gas boiler (waste heat recovery boiler), and steam turbine are combined has been used as a thermal power generation plant.

Figure 6:
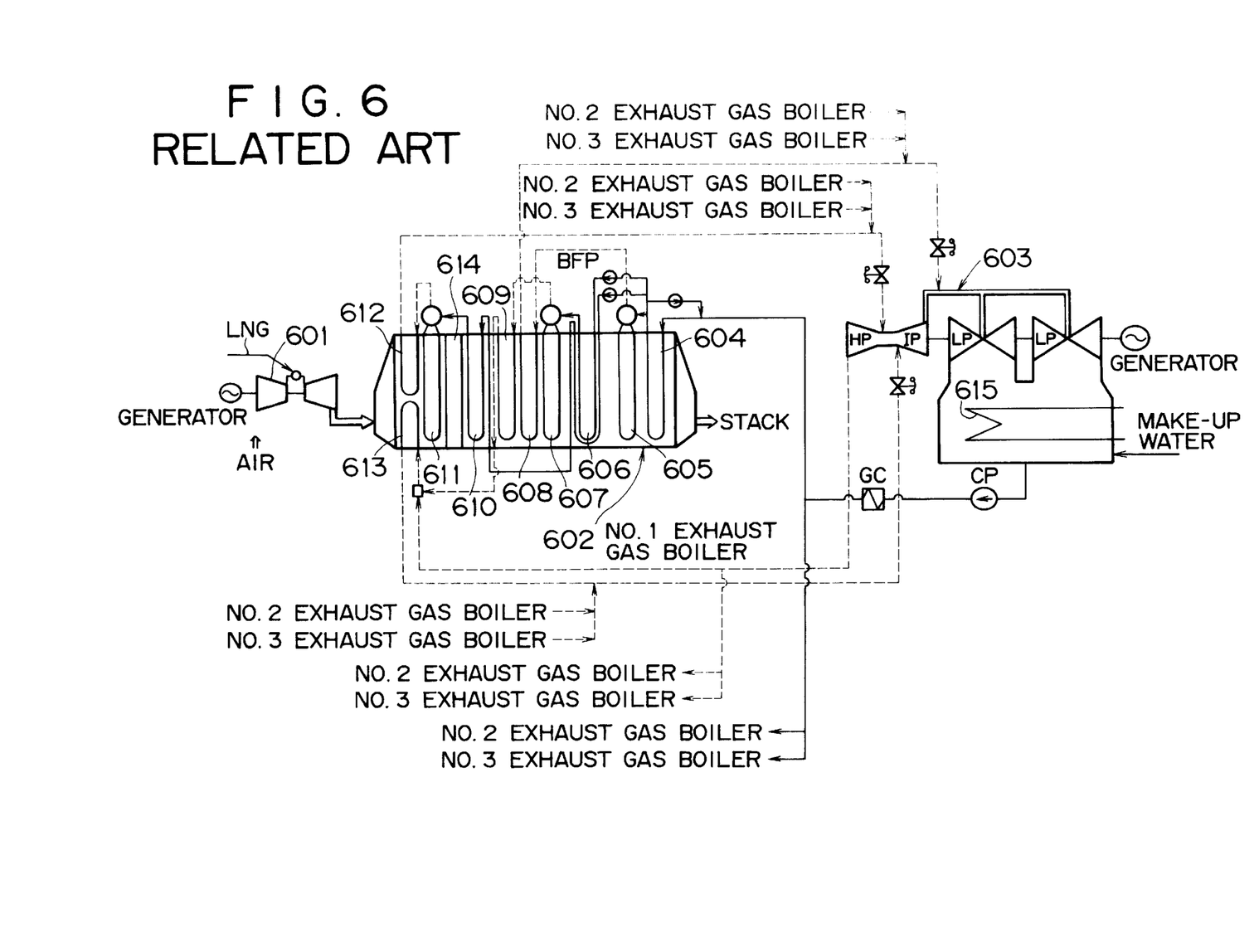
FIG. 6 is a schematic view for illustrating one example of a conventional combined power generation plant.

FIG. 6 shows one example of a well-known multi-shaft reheat type combined power generation plant. This plant includes gas turbines 601, exhaust gas boilers 602, a steam turbine 603, and generators. Although three gas turbines 601 and three exhaust gas boilers are provided, only one each is shown, and No. 2 and No. 3 gas turbines and exhaust gas boilers are omitted in the figure.

The gas turbine 601 takes in air from the compression side, feeds burned fuel to the expansion side, and sends exhaust gas to the exhaust gas boiler 602. This gas turbine 601 generates electric power.

The exhaust gas boiler 602 uses a triple pressure reheat type construction having low-, intermediate-, and high-pressure waste heat recovery sections. Specifically, this exhaust gas boiler includes a low-pressure economizer (LP ECO) 604, a low-pressure evaporator (LP EVA) 605, a high- and intermediate-pressure economizer (IP ECO & HP ECO1) 606, an intermediate-pressure evaporator (IP EVA) 607, a low-pressure superheater (LP SH) 608, an intermediate-pressure superheater (IP SP) 609, a high-pressure economizer (HP ECO2) 610, a high-pressure evaporator (HP EVA) 611, a high-pressure superheater (HP SH) 612, and a reheater (IP RH) 613. The operations of these pieces of the aforesaid equipment are the same as those of the publicly known equipment. Also, an NOx removal system 614 is provided at the subsequent stage of the high-pressure evaporator 611.

Further, BFP stands for a boiler feed water pump. CP stands for a condensed water pump. GC stands for a grand condenser heater.

Figure 7:
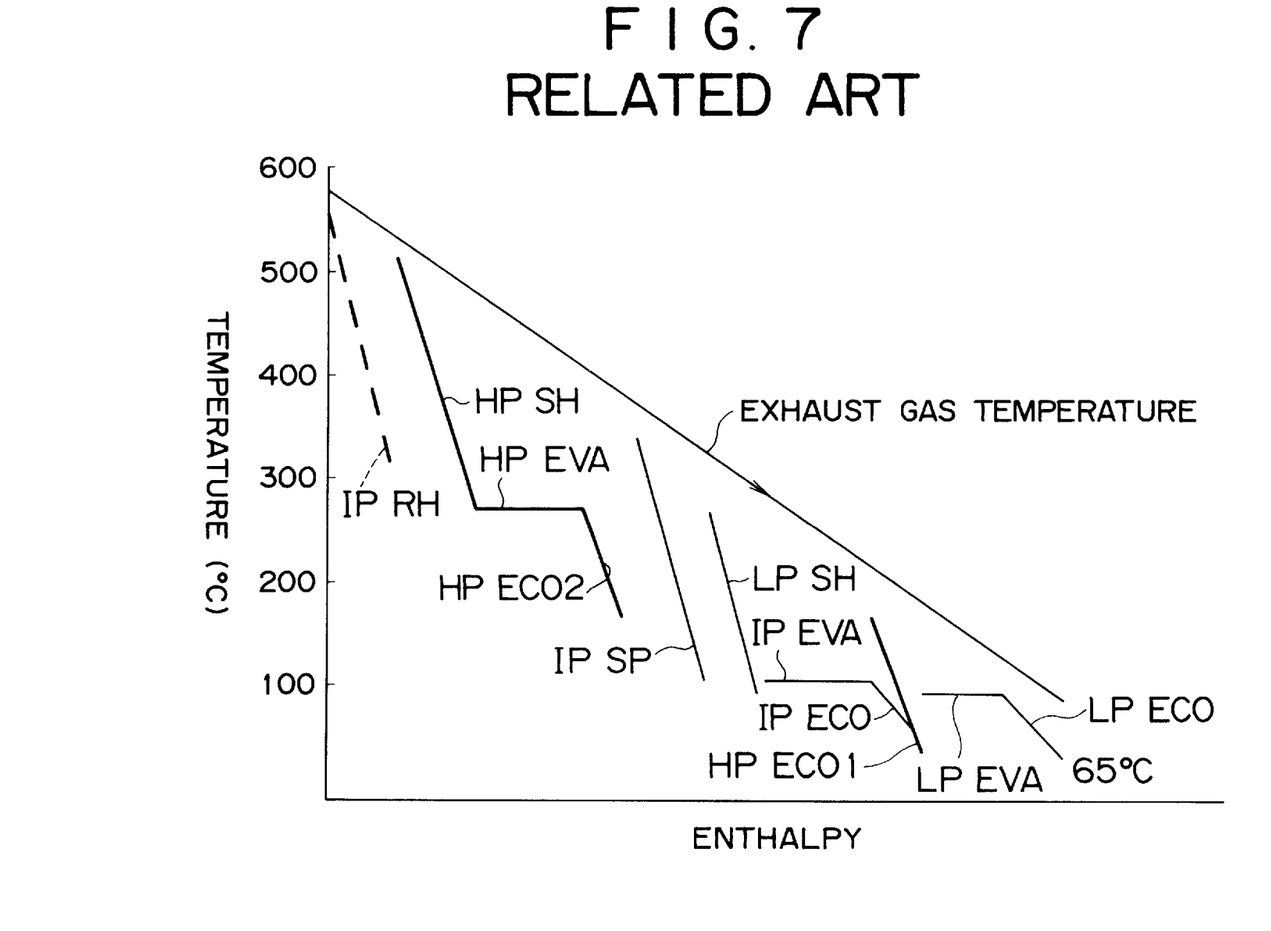
FIG. 7 is a graph showing a thermodynamic sequence for waste heat recovery in the conventional combined power generation plant shown in FIG. 6.

FIG. 7 shows a sequence for waste heat recovery in the aforesaid waste heat recovery equipment. In FIG. 7, the abbreviation indicated by alphabets corresponds to each of the aforesaid waste heat recovery equipment.

The exhaust gas boiler 602 recovers waste heat from the exhaust gas introduced from the inlet by using the aforesaid equipment, and feeds the generated steam to the steam turbine 603 to generate electric power. The exhaust gas is finally discharged through a stack. In the figure, the solid lines indicate the flow of feed water, and the dotted lines indicate the flow of steam.

To the steam turbine 603, steam is sent from not only the shown No. 1 exhaust gas boiler 602 but also No. 2 and No. 3 exhaust gas boilers. Also, water from a condenser and make-up water are sent to these exhaust boilers through lines.

A power generation plant having the same configuration as that of the example shown in FIG. 6, which uses 1350° C.-class gas turbines, really exists. Its total output at an atmospheric temperature of 22° C. is 670 MW, and the plant efficiency (generating end) is 48.7%.

The reason why the exhaust gas boiler 602 is of a triple pressure reheat type having low-, intermediate-, and high-pressure waste heat recovery sections is that as seen from FIG. 7, waste heat cannot be recovered well at low temperatures by the high-pressure waste heat recovery section (HP ECO, HP EVA, HP SH) only.

From an idealistic viewpoint, high-pressure waste heat recovery should mainly be carried out. In this case, however, the temperature of exhaust gas must be increased. For this purpose, a method has been tried in which some LNG gas is supplied in the exhaust gas boiler and burned. However, this method is impractical for the reason that it is difficult to properly control incomplete combustion and combustion condition and other reasons. For example, the piping material is designed so as to match the assumed temperature.

SUMMARY OF THE INVENTION

Accordingly, an object of the present invention is to provide a combined power generation plant which increases the power generation efficiency by raising the temperature of exhaust gas without combustion due to fuel ignition in an exhaust gas boiler.

To achieve the above object, one aspect of the present invention is a combined power generation plant in which electric power is generated by a power generation gas turbine, exhaust gas from the power generation gas turbine is sent to an exhaust gas boiler, and a power generation steam turbine is rotated with the steam generated by heat recovered by the exhaust gas boiler to generate electric power, the improvement resides in that the exhaust gas boiler consists of a high-pressure reheat type steam system in which fuel is supplied to the exhaust gas boiler, and the supplied fuel undergoes catalytic reaction in a combustion catalysis section to increase the temperature of exhaust gas, whereby the power generation efficiency is improved.

The combustion catalysis section can be provided at the preceding stage of either one or both of a reheater and a superheater. Further, the combustion catalysis section can be provided at the preceding stage of at least any one of a reheater, a re-reheater, and a superheater.

A catalyst used in the combustion catalysis section can be a catalyst containing a transition metal or an oxide thereof. Any of the combustion catalysis sections may have an NOx removal performance.

In any of the preferred embodiments of the present invention, the exhaust gas boiler may be provided with a temperature sensor, an LNG supply system may be provided with a flow control and a flow regulating valve, and the flow regulating valve may be controlled by the flow control to control the supply amount of LNG, whereby the temperature of exhaust gas can be kept proper.

Thus, according to the present invention, there is provided a combined power generation plant which increases the power generation efficiency by raising the temperature of exhaust gas without combustion due to fuel ignition in an exhaust gas boiler.

In the combined power generation plant in accordance with the present invention, an automotive exhaust gas combustion catalyst, whose performance has already been verified practically as described above, can be used. Such a catalyst in a small amount is expected to achieve a sufficient effect, so that too large an apparatus is not needed.

Also, unburned combustibles of LNG in the exhaust gas from the gas turbine can be burned completely.

Further, in the present invention, the temperature control of exhaust gas can be carried out relatively easily by controlling the quantity of LNG supplied to the exhaust gas boiler. Therefore, in designing the pipes in which steam circulates, excessive material quality and wall thickness need not be set.

Still further, when the NOx removal performance is given to the combustion catalysis section, LNG can be burned and also NOx can be removed with high efficiency in the combustion catalysis section which is also used as the NOx removal section. Therefore, this configuration has advantages over the case of ammonia injection that a high-pressure ammonia supply facility (tank, etc.) is not needed, the leakage of ammonia need not be considered, and only an LNG facility is necessary.

DETAILED DESCRIPTION OF THE PREFERRED EMBODIMENT

Embodiments of the present invention will now be described below with reference to the accompanying drawings.

Embodiment (No. 1)

Figure 1:
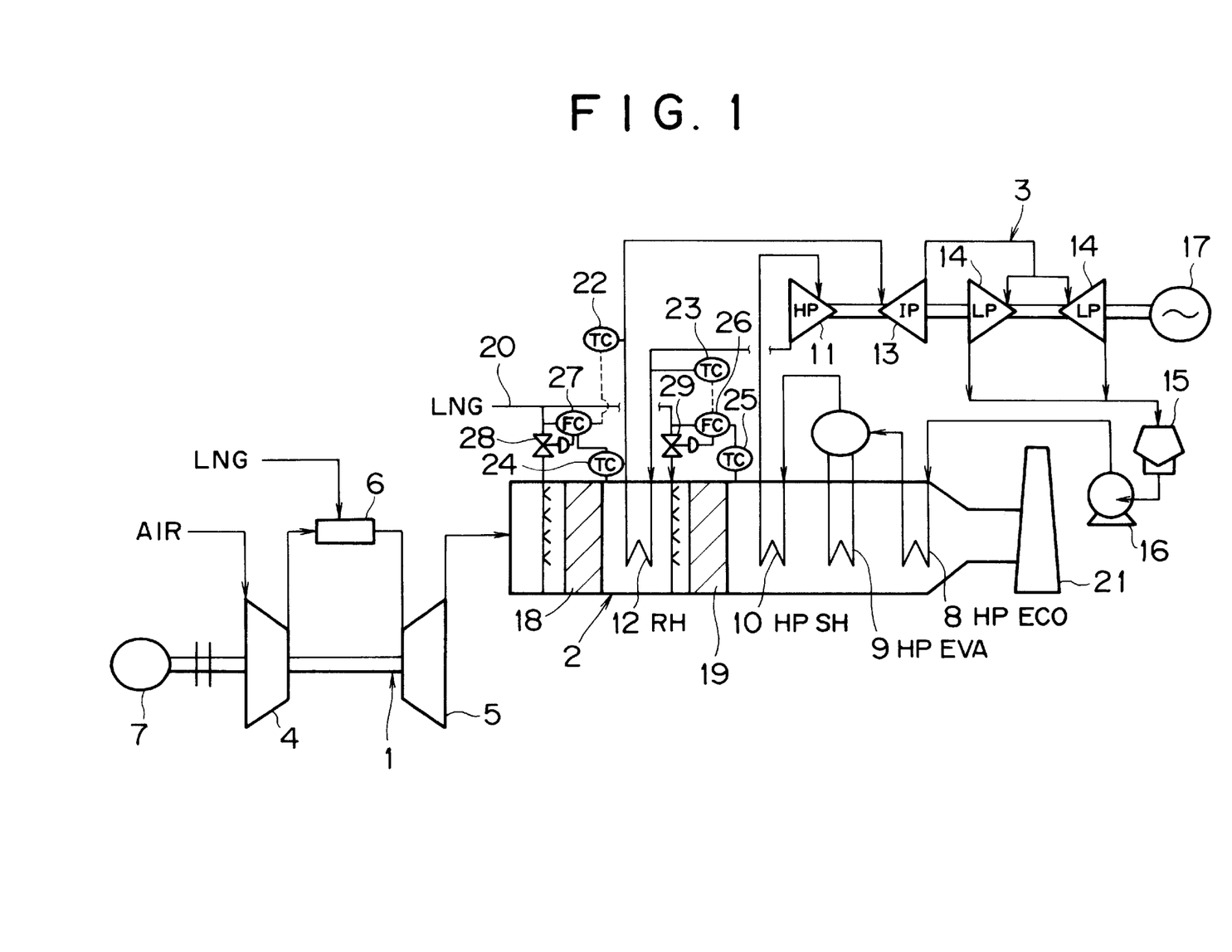
FIG. 1 is a schematic view for illustrating one embodiment of a combined power generation plant in accordance with the present invention.

FIG. 1 shows one embodiment of a combined power generation plant in accordance with the present invention. This embodiment relates to a multi-shaft reheat type combined plant in which a gas turbine 1, exhaust gas boiler (waste heat recovery boiler) 2, and a steam turbine 3 are combined. Although only one gas turbine 1 and only one exhaust gas boiler 2 are shown in the figure, a plurality of these pieces of equipment may be provided in parallel as in the above-described conventional example.

The gas turbine 1 takes in air from the compression side 4, burns fuel (LNG gas) in a combustion chamber 6 and feeds it to the expansion side 5, and sends exhaust gas to an exhaust gas boiler 2. The rotation of this gas turbine 1 generates electric power by using a generator 7.

The steam system of the exhaust gas boiler 2 is of a high-pressure reheat type. In this exhaust gas boiler 2, feed water flows through a high-pressure economizer (HP ECO) 8, a high-pressure evaporator (HP EVA) 9, and a high-pressure superheater (HP SH) 10 to recover waste heat. The operations of these pieces of the aforesaid equipment are the same as those of the publicly known equipment.

The steam from the high-pressure superheater 10 is supplied to the high pressure side (HP) 11 of the steam turbine 3, returned to a reheater (RH) 12, and then supplied to the intermediate pressure side (IP) 13 of the steam turbine. Then, the steam is sent from the intermediate pressure side to the low pressure side (LP) 14, being returned to water by a condenser 15, and fed to the exhaust gas boiler 2 through a compressor 16 as feed water. Although not shown, make-up water is appropriately supplied separately. By the aforementioned flow of steam, the steam turbine 3 is rotated, so that electric power is generated by using a generator 17. The exhaust gas from the exhaust gas boiler 3 is finally discharged through a stack 21.

In this embodiment, the exhaust gas boiler 2 includes combustion catalysis sections 18 and 19, which are the characteristic portions of the present invention, and a fuel supply line 20. The combustion catalysis sections 18 and 19 are provided at the preceding stage of the reheater 12 and the high-pressure superheater 10 as shown in the figure. At the preceding stage of the combustion catalysis sections 18 and 19, a fuel injection system for supplying fuel from the fuel (LNG gas) supply line 20 is provided.

As a catalyst used in the combustion catalysis sections 18 and 19, concretely, a catalyst containing a transition metal or its oxide, preferably, a catalyst containing a metal of iron group element and/or platinum group element or its oxide can be enumerated. For example, the following catalyst can be used.

(1) A catalyst in which a heat-resistant base material such as cordierite is coated with powder in which at least one kind of platinum, palladium, and rhodium is supported as an active component on a carrier containing at least one kind of oxide selected out of the oxides of group consisting of alumina, silica, titania, and zirconia.

(2) A catalyst in which at least one kind of oxide selected out of a group consisting of an oxide of alkali earth element and an oxide of rare earth element is added to the aforesaid catalyst as a co-catalyst.

(3) A catalyst containing at least one kind selected out of a group consisting of metals such as copper, vanadium, chromium, iron, and nickel and oxides of these metals.

The quantity of catalyst used in the combustion catalysis sections 18 and 19 should be sufficient for at least the assumed gas flow rate and the intended exhaust gas temperature.

In the combined power generation plant of this embodiment, which is provided with the combustion catalysis sections 18 and 19, LNG gas is allowed to react by catalytic reaction in the combustion catalysis sections 18 and 19, by which the temperature of exhaust gas is increased. Therefore, waste heat can be recovered efficiently by the high-pressure waste heat recovery section only.

The combustion caused by catalytic reaction is not a combustion reaction such that the fire flames up, unlike the combustion reaction caused by ordinary ignition. Therefore, the control is relatively easy. As shown in FIG. 1, temperature sensors 22, 23, 24, and 25 are provided at appropriate positions, and flow regulating valves 28 and 29 are appropriately controlled by flow controls 26 and 27 to control the supply of LNG, by which the temperature is kept proper.

Figure 2:
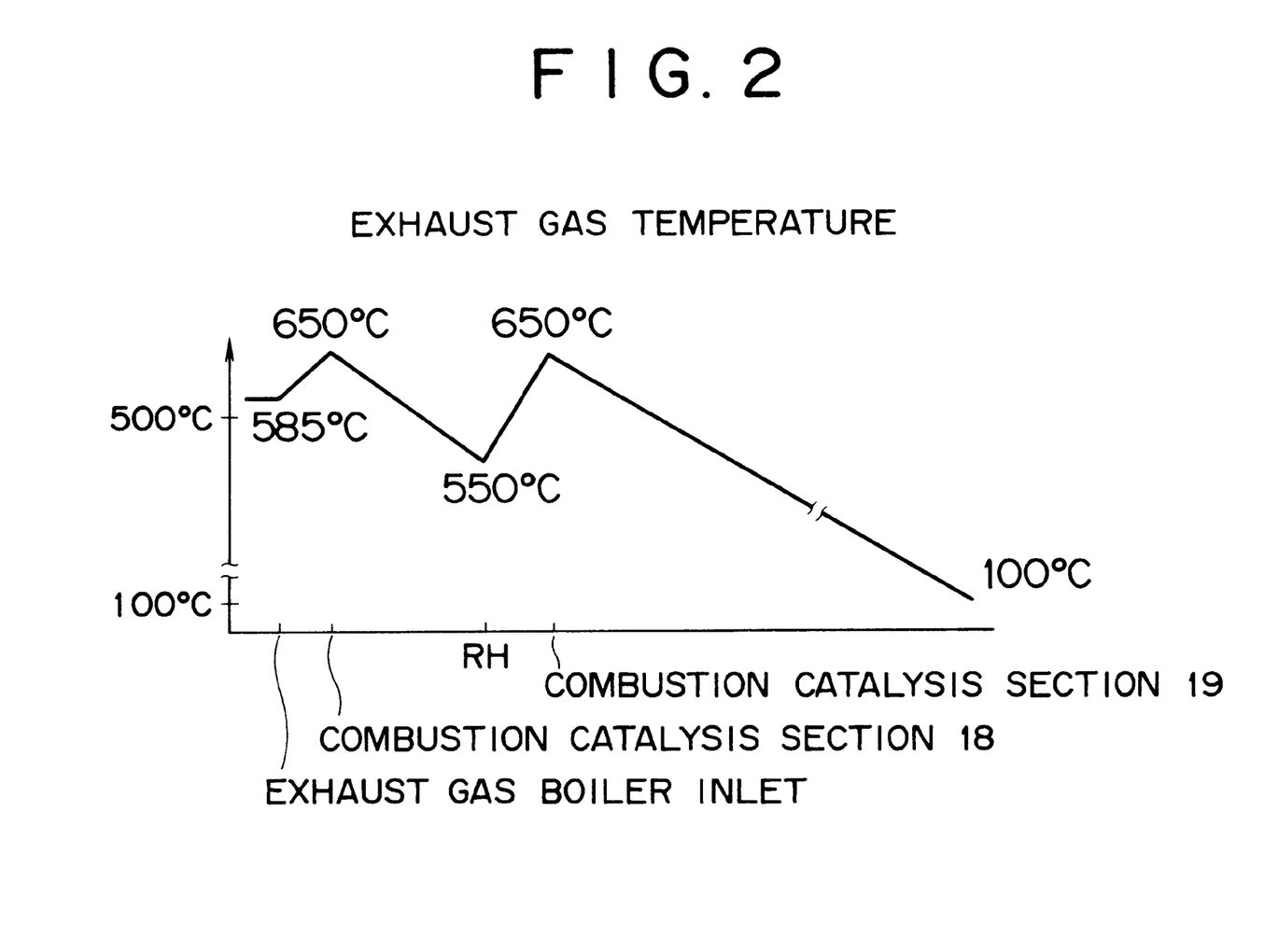
FIG. 2 is a graph for illustrating the temperature distribution in an exhaust gas boiler in the embodiment shown in FIG. 1.

FIG. 2 shows the distribution of exhaust gas temperature. The exhaust gas temperature of 585° C. at the exhaust gas boiler inlet is changed to 650° C. after the gas passes through the combustion catalysis section 18, decreased to 550° C. after the gas passes through the reheater 12, and changed again to 650° C. after the gas passes through the combustion catalysis section 19.

Figure 3:
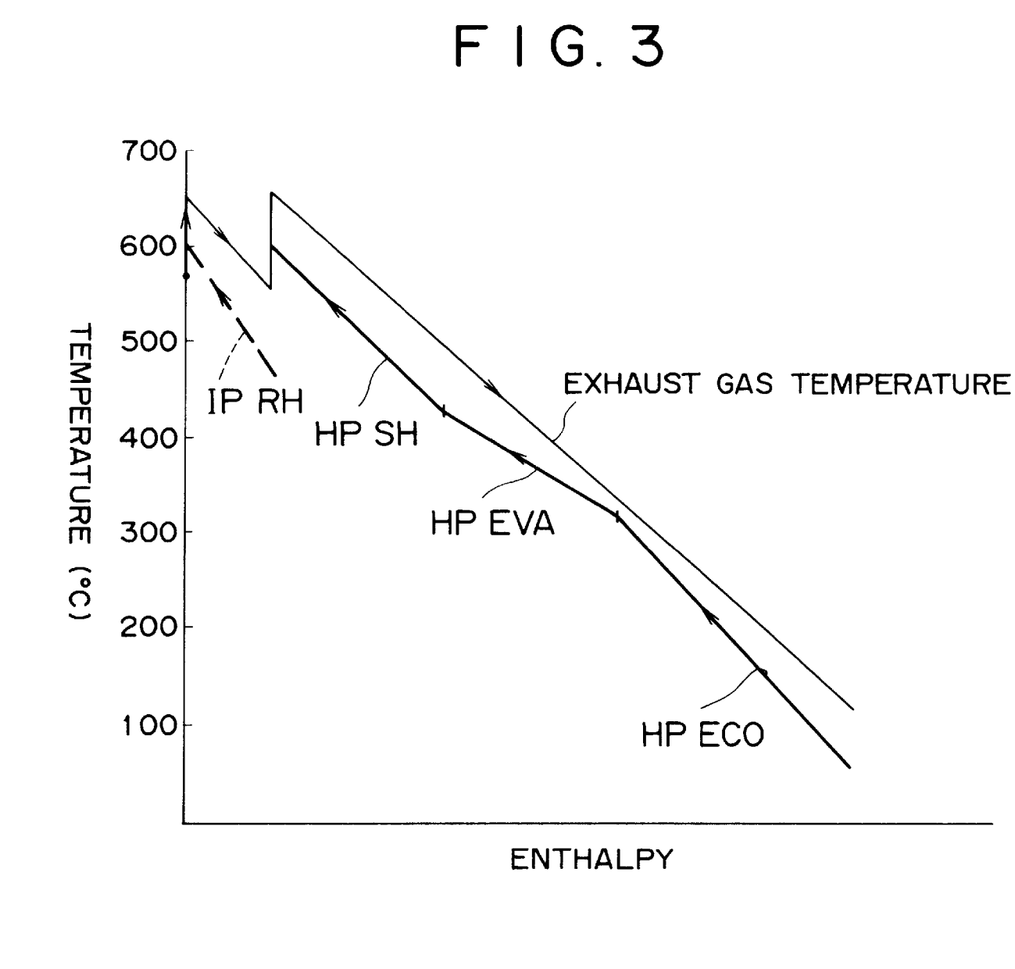
FIG. 3 is a graph showing a thermodynamic sequence for waste heat recovery in the embodiment shown in FIG. 1.

FIG. 3 shows a thermodynamic sequence of waste heat recovery according to this embodiment. In FIG. 3, the abbreviation indicated by alphabets corresponds to each of the aforesaid waste heat recovery equipment. By increasing the exhaust gas temperature, the thermal efficiency of the exhaust gas boiler 2 is increased. In the actual boiler, waste heat recovery is carried out like the high-pressure economizer (HP ECO), high-pressure evaporator (HP EVA), and high-pressure superheater (HP SH) indicated by the thick solid line and the reheater (RH) indicated by the dotted line. As seen from FIG. 3, waste heat can be recovered by the high-pressure steam system only in the range from the high-temperature zone to the low-temperature zone of exhaust gas.

Embodiment (No. 2)

Next, another embodiment of the present invention will be described with reference to FIG. 1.

This embodiment has the same configuration as that of the above embodiment described with reference to FIG. 1, except that the aforesaid combustion catalysis sections 18 and 19 are also used as NOx removal sections. In other words, in this embodiment, a catalyst having not only a function of combustion catalyst but also a function of NOx removal catalyst is used.

As a catalyst having both of the functions of combustion catalyst and NOx removal catalyst, various catalysts can be used. For example, catalysts in which an active metal such as Ga, Pd, Cu, and Co is supported on a carrier such as ZSM-5 type zeolite, mordenite, and $Al_2O_3$ can be enumerated.

Among these catalysts, Co-Beta, Co-Mor, Co-ZSM-5, and Co/$Al_2O_3$ are preferable, which are listed in Table 1 in "Takeshi Tabata, Takatoshi Nakahira, and Hirofumi Ohtsuka, NOx Selecting Reduction Catalyst for Natural Gas Combustion Exhaust Gas Purification, Catalysts & Catalysis (issued by Catalysis Society of Japan) Vol. 39, No. 3, 1997".

In particular, the Co-Beta catalyst, which is one kind of Co-ZSM-5 catalyst, is ideal. This catalyst decomposes 100% of LNG component at 500° C., and at the same time decomposes NOx component with high efficiency. This catalyst also has an enhanced life.

Further, Pt/$Al_2O_3$, Rh/$Al_2O_3$, Ag/$Al_2O_3$, Co/$Al_2O_3$, AuMn/$Al_2O_3$, Pt-ZSM-5, Cu-ZSM-5, Ir/In-ZSM-5, and $Mn_2O_3$/Ce-ZSM-5 can also be used, which are listed in Table 1 in "Akira Obuchi, Isamu Kaneko, Junko Ohi, Akihiko Ohi, Atushi Ogata, Satoshi Kushiyama, and koichi Mizuno, Evaluation of NOx Selecting Reduction Catalyst Using Organic Compound with Diesel Exhaust Gas Actual Scale, Catalysts & Catalysis (issued by Catalysis Society of Japan) Vol. 38, No. 2, 1996".

In the combined power generation plant of this embodiment, the concentration of NOx component is usually 30 to 50 ppm ($O_2$ 16% conversion) at the exhaust gas boiler inlet. This concentration must be kept at a value of 5 ppm or less at the exhaust gas boiler outlet. In the combined power generation plant, in order for the temperature of exhaust gas to be increased by catalytic combustion, a concentration of about 2000 ppm ($O_2$ 16% conversion) is added. Therefore, of this concentration, 50 ppm ($O_2$ 16% conversion) at the most is consumed in NOx removal. For this reason, the combustion catalysis section can have an NOx removal performance without hindrance.

When LNG is used for NOx removal, propane is the most efficient. Therefore, standard LNG from Indonesia, Malaysia, and Australia containing propane of about 1/40 (molar ratio) is preferable. For LNG containing less propane, propane may be added so that the LNG contains propane of about 1/40 (molar ratio). Further, only propane can be supplied.

According to this embodiment, in the combustion catalysis sections 18 and 19, LNG can be burned, and also NOx can be removed efficiently. This embodiment has advantages over the case of ammonia injection that a high-pressure ammonia supply facility (tank, etc.) is not needed, the leakage of ammonia need not be considered, and only an LNG facility is necessary.

The combined power generation plant in accordance with the present invention is not limited to the above-described embodiments, and can be modified variously in the scope of technical conception of the present invention.

The combustion catalysis section (NOx removal section) 18, 19 may be provided at the preceding stage of either one of the reheater and superheater.

Also, in the exhaust gas boiler having a re-reheater, the combustion catalysis section (NOx removal section) can be provided at the preceding stage of at least any one of the reheater, re-reheater, and superheater.

In the case where a plurality of combustion catalysis sections are provided, although all combustion catalysis sections have NOx removal performance in the above-described embodiment (No. 2), at least one combustion catalysis section may have NOx removal performance. Further, in the above-described embodiment (No. 2), a combustion catalyst having NOx removal performance is used. However, both of a combustion catalyst and an NOx removal catalyst are used so as to give NOx removal performance to the combustion catalysis section. Still further, the NOx removal performance can be given to the combustion catalysis section by providing two-layer combustion catalysis section consisting of a combustion catalyst layer and an NOx removal catalyst layer.

Working examples

Working example 1

The plant efficiency of the combined power generation plant of the above-described embodiment (No. 1) and the plant efficiency of a conventional thermal power generation plant were calculated.

Figure 4:
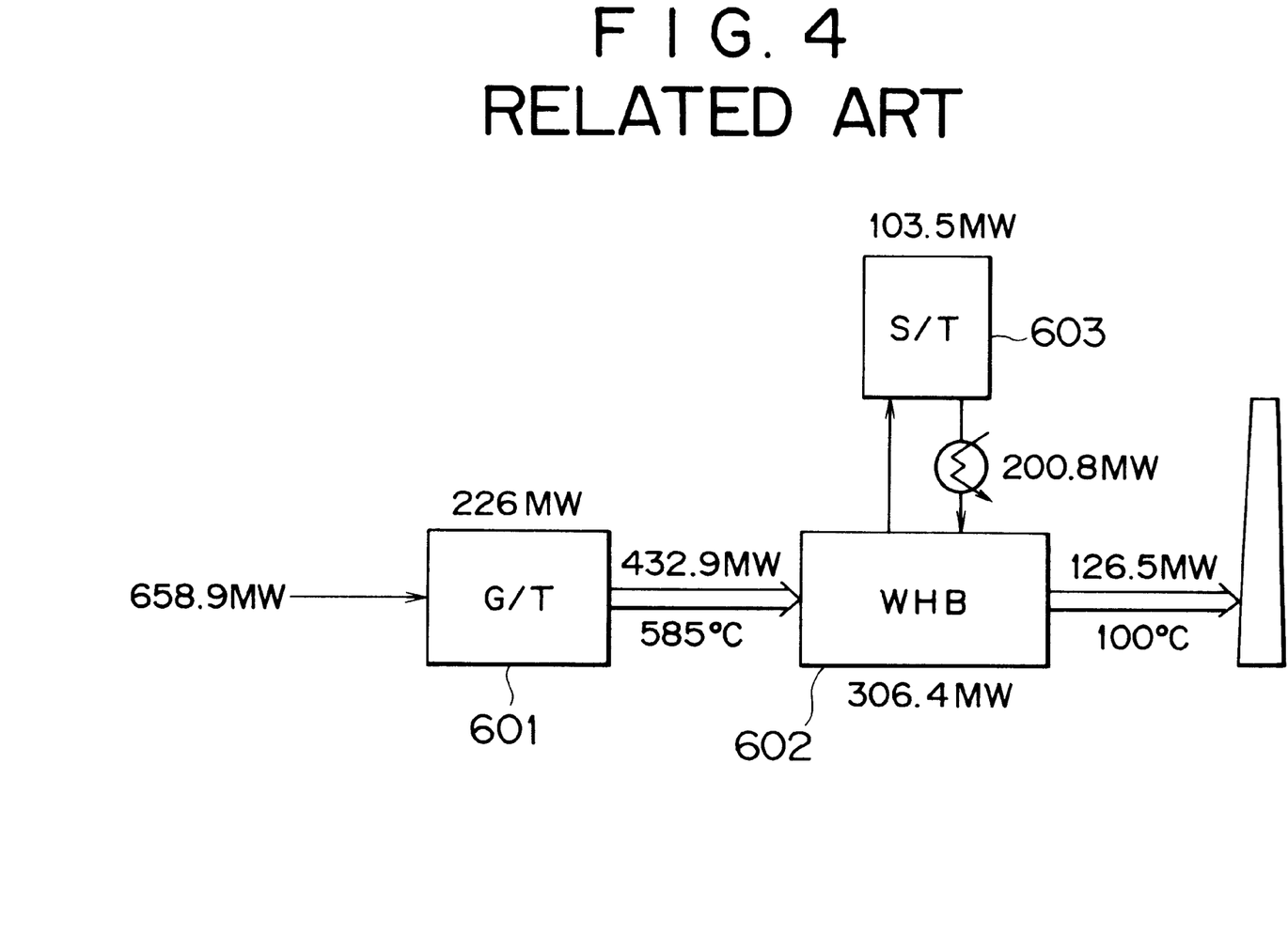
FIG. 4 is a schematic view for illustrating a concept for calculating the plant efficiency for the most efficient plant among the conventional combined power generation plants.
Figure 5:
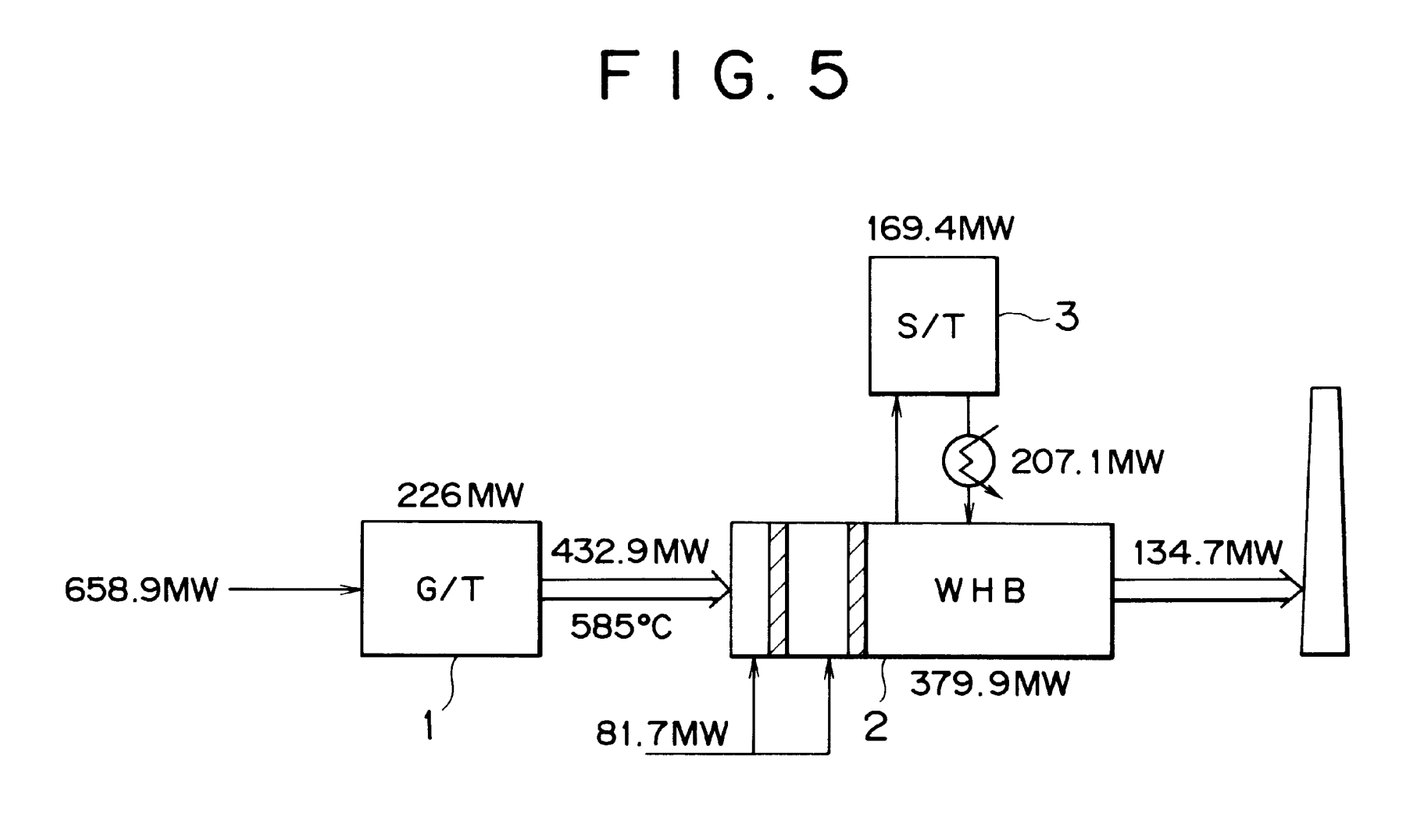
FIG. 5 is a schematic view for illustrating a concept for calculating the plant efficiency for the combined power generation plant in accordance with the embodiment shown in FIG. 1.

FIGS. 4 and 5 are schematic views for clarifying the calculation procedure.

FIG. 4 relates to a combined power generation plant in operation at present. Raw material LNG gas corresponding to 658.9 MW is introduced to the gas turbine 601, where electric power of 226 MW is generated, and exhaust gas of 585° C. corresponding to 432.9 MW is discharged. This gas turbine 601 uses a 1500° C.-class gas turbine which has a higher efficiency than the aforesaid conventional 1350° C.-class gas turbine.

The exhaust gas is sent to the aforesaid conventional triple pressure reheat type exhaust gas boiler 602, and receives heat corresponding to 306.4 MW by waste heat recovery. This heat generates electric power of 103.5 MW by using the steam turbine 603. Of the received energy, the energy corresponding to 200.8 MW is discharged by the condenser, and 2.1 MW is lost by mechanical loss. Exhaust gas of 100° C. is discharged from the exhaust gas boiler 602, and the energy corresponding to 126.5 MW is also discharged.

The efficiency of the conventional thermal power generation plant is calculated as follows:

$\eta=(226+103.5)/658.9\times100=50.1\%$

FIG. 5 relates to a combined power generation plant of the above-described embodiment shown in FIG. 1. Raw material LNG gas corresponding to 658.9 MW is introduced to the gas turbine 1, there electric power of 226 MW is generated, and exhaust gas of 585° C. corresponding to 432.9 MW is discharged. This gas turbine 1 uses a 1500° C.-class gas turbine.

The exhaust gas is sent to the exhaust gas boiler 2 of the embodiment shown in FIG. 1, supplied with LNG gas corresponding to 81.7 MW, and receives heat corresponding to 379.9 MW by waste heat recovery. This heat generates electric power of 169.4 MW by using the steam turbine 3. Of the received energy, the energy corresponding to 207.1 MW is consumed by the condenser 15, and 3.4 MW is lost by mechanical loss. Exhaust gas is discharged from the exhaust gas boiler 2, and the energy corresponding to 134.7 MW is also discharged.

The efficiency of the combined power generation plant in accordance with the present invention is calculated as follows:

$$\eta = (226+169.4)/(658.9+81.7) \times 100 = 53.39\%$$

Therefore, in the combined power generation plant of the above-described embodiment, an efficiency increase of 6.4% is expected as compared with the conventional thermal power generation plant.

Working example 2

Combustion catalysis test

A combustion catalysis test was made for the purpose of utilization for gas turbine vehicles using methane of natural gas component. A catalyst in which a heat-resistant base material of cordierite is coated with powder in which platinum is supported as an active component on an alumina carrier was used. The test was made under the conditions that the methane concentration in the inlet gas is 1.85%, the GHSV(Gas Hourly Space Velocity) is $2 \times 10^4$ to $6 \times 10^4$ $h^{-1}$, and test temperature is 350 to 450° C. The test result is given in Table 1.

TABLE 1

Methane combustion test result

| GHSV ($h^{-1}$) | 350° C. Methane conc.* (ppm) | 350° C. Combustion rate (%) | 400° C. Methane conc.* (ppm) | 400° C. Combustion rate (%) | 450° C. Methane conc.* (ppm) | 450° C. Combustion rate (%) |
|---|---|---|---|---|---|---|
| $2 \times 10^4$ | 0.6 | 99.9968 | 0.2 | 99.9989 | 0.1 | 99.9995 |
| $4 \times 10^4$ | 2.50 | 99.9865 | 1.54 | 99.9917 | 0.76 | 99.9959 |
| $6 \times 10^4$ | 27.2 | 99.8530 | 20.2 | 99.8908 | 15.2 | 99.9178 |

*Methane concentration in outlet gas

As seen from the above result, methane is almost 100% decomposed in the combustion catalysis section. Therefore, even if methane (LNG gas) is supplied as a fuel, there is no possibility that unburned combustibles remain. Even if unburned combustibles remain in the exhaust gas, they are burned completely in this combustion catalysis section. Although the catalytic reaction is intended to be carried out in the range of 550 to 650° C. in the combustion catalysis section in this application, the test result in Table 1 shows a tendency for complete combustion to occur with increasing temperature, so that better performance is expected.

The entire disclosure of Japanese Patent Application No. 9-233785 filed on Aug. 29, 1997 including specification, claims, drawings and summary are incorporated herein by reference in its entirety.

The entire disclosure of Japanese Patent Application No. 9-254970 filed on Sep. 19, 1997 including specification, claims, drawings and summary are incorporated herein by reference in its entirety.

What is claimed is:

1. A combined power generation plant in which exhaust gas from a power generation gas turbine is sent to an exhaust gas boiler, and a power generation steam turbine is rotated with steam generated by said exhaust gas boiler, characterized in that said exhaust gas boiler consists of a high-pressure reheat type steam system comprising a high-pressure economizer, a high-pressure evaporator, and a high-pressure superheater to recover waste heat in which fuel is supplied to said exhaust gas boiler by a fuel supply line and the supplied fuel undergoes catalytic reaction in a catalysis section to increase the temperature of exhaust gas.

2. A combined power generation plant according to claim 1, further comprising a reheater, and wherein said catalysis section is provided at the preceding stage of either one or both of the reheater and the superheater.

3. A combined power generation plant according to claim 1, further comprising a reheater, and a re-reheater, and wherein said combustion catalysis section is provided at the preceding stage of at least any one of the reheater, the re-reheater, and the superheater.

4. A combined power generation plant according to any one of claims 1 to 3, wherein at least one of said combustion catalysis sections has an NOx removal performance.

5. A combined power generation plant in which exhaust gas from a power generation gas turbine is sent to an exhaust gas boiler, and a power generation steam turbine is rotated with steam generated by said exhaust gas boiler, characterized in that said exhaust gas boiler consists of a high-pressure reheat type steam system comprising a high-pressure economizer, a high-pressure evaporator, and a high-pressure superheater to recover waste heat in which fuel is supplied to said exhaust gas boiler, and the supplied fuel undergoes catalytic reaction in a catalysis section to increase the temperature of exhaust gas, wherein said exhaust gas boiler is provided with a temperature sensor, a liquid natural gas-supply system supplying said fuel and being provided with a flow controller and a flow regulating valve, and said flow regulating valve is controlled by said flow controller to control the supply amount of liquid natural gas, whereby the temperature of exhaust gas is kept proper.

6. A combined power generation plant according to claim 5, further comprising a reheater, and wherein said combustion catalysis section is provided at the preceding stage of either one or both of the reheater and the superheater.

7. A combined power generation plant according to claim 5, further comprising a re-heater and a re-reheater, and wherein said combustion catalysis section is provided at the preceding stage of at least any one of the reheater, the re-reheater, and the superheater.

8. A combined power generation plant according to any one of claims 5 to 7, wherein at least one of said combustion catalysis sections has an NOx removal performance.

9. A combined power generation plant in which exhaust gas from a power generation gas turbine is sent to an exhaust gas boiler, and a power generation steam turbine is rotated with steam generated by said exhaust gas boiler, characterized in that said exhaust gas boiler consists of a high-pressure reheat type steam system comprising a high-pressure economizer, a high-pressure evaporator, and a high-pressure superheater to recover waste heat in which fuel is supplied to said exhaust gas boiler by a fuel supply line, and the supplied fuel undergoes catalytic reaction in a catalysis section to increase the temperature of exhaust gas, wherein the catalysis section is a catalyst containing a transition metal or an oxide thereof.

10. A combined power generation plant according to claim 9, further comprising a reheater, and wherein said catalysis section is provided at the preceding stage of either one or both of the reheater and the superheater.

11. A combined power generation plant according to claim 9, further comprising a reheater, and a re-reheater, and wherein said combustion catalysis section is provided at the preceding stage of at least any one of the reheater, the re-reheater, and the superheater.

12. A combined power generation plant according to claim 9, wherein at least one of said catalysis section has an NOx removal performance.

13. A combined power generation plant plant in which exhaust gas from a power generation gas turbine is sent to an exhaust gas boiler, and a power generation steam turbine is rotated with steam generated by said exhaust gas boiler, characterized in that said exhaust gas boiler consists of a high-pressure reheat type steam system comprising a high-pressure economizer, a high-pressure evaporator, and a high-pressure superheater to recover waste heat in which fuel is supplied to said exhaust gas boiler and the supplied fuel undergoes catalytic reaction in a catalysis section to increase the temperature of exhaust gas, wherein said exhaust gas boiler is provided with a temperature sensor, a liquid natural gas supply system supplying said fuel and being provided with a flow controller and a flow regulating valve, and said flow regulating valve is controlled by said flow controller to control the supply amount of liquid natural gas, whereby the temperature of exhaust gas is kept proper, wherein the catalysis section is a catalyst containing a transition metal or an oxide thereof.

14. A combined power generation plant according to claim 13, further comprising a reheater, and wherein said catalysis section is provided at the preceding stage of either one or both of the reheater and the superheater.

15. A combined power generation plant according to claim 13, further comprising a reheater, and a re-reheater, and wherein said combustion catalysis section is provided at the preceding stage of at least any one of the reheater, the re-reheater, and the superheater.

16. A combined power generation plant according to claim 13, wherein at least one of said catalysis section has an NOx removal performance.

* * * * *